May 6, 1941.   D. A. MEAD   2,240,710
OSCILLATION JOINT
Filed Sept. 6, 1938

INVENTOR
DELL A. MEAD
BY
Whittemore Hulbert Belknap
ATTORNEYS

Patented May 6, 1941

2,240,710

UNITED STATES PATENT OFFICE 2,240,710

OSCILLATION JOINT

Dell A. Mead, Detroit, Mich.

Application September 6, 1938, Serial No. 228,693

4 Claims. (Cl. 287—85)

The invention relates to oscillation joints of that type in which the two relatively oscillatory members are connected by a resilient material intermediate the same and in the body of which the necessary displacement takes place. It is the object of the present invention to obtain an improved structure of this type, and to this end the invention consists in the method and the resulting structure as hereinafter set forth.

In the construction of oscillation joints of the type above referred to, rubber or other resilient material having similar properties, is used as the medium through which the stresses are transmitted and which permits of the relative displacements. It is, however, desirable that the resilient body should be placed under initial tension in which condition it will function more satisfactorily. With my improvement I have devised a method of producing the resilient body under the desired initial tension and also a novel construction of oscillation joint in which said body is incorporated.

Figure 1:
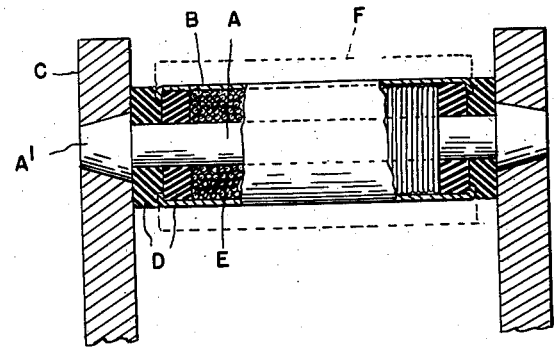
Figure 1 is an axial section through an oscillation joint of my improved construction.
Figure 2:
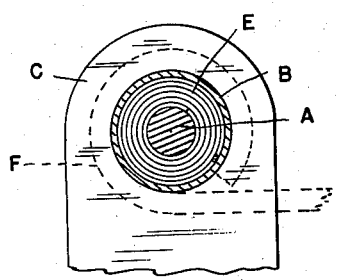
Figure 2 is a cross section thereof.
Figure 3:
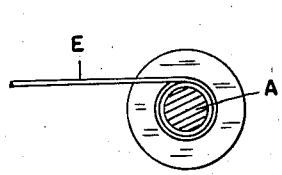
Figures 3 and 4 are respectively, a cross section and a longitudinal section, illustrating the manner of forming the resilient body constituting an element of the joint.
Figure 4:
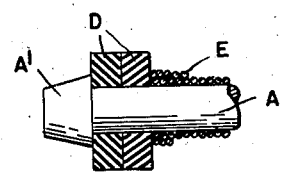

The basic feature of my improvement is the forming of the resilient body of windings of strands of rubber or equivalent resilient material, the successive layers of said strands forming a body of the desired dimensions. During the winding each strand is maintained under the desired tension so that in the completed body all portions thereof are under the same tension. As specifically illustrated, the oscillation joint is designed for use in a shackle and comprises a central shaft or pin A surrounded by the resilient windings and preferably enclosed within an outer metallic shell B. Figures 3 and 4 illustrate the manner of forming the resilient body, and as shown the member A has at its opposite ends shouldered outwardly tapering heads A', which are suitable for connection with links C of a shackle. Adjacent to the shoulders of these heads are placed one or more resilient disks D which form the heads of a spool. The member A is then revolved and a strand E is wound thereon between the disks D until the entire space to the periphery of the disk is filled. The tubular shell B is then placed in position to surround the wound body as well as the inner members of the disks D, after which the opposite ends of said member B are spun inward to form a shouldered engagement with said disks. The structure is then in condition for engagement with the eye of a spring or other bearing member, as indicated by dotted lines at F, Figure 1.

With the construction as described, the frictional adhesion between the surfaces of the stranded body and the metallic members adjacent thereto is sufficient to maintain fixed contact. Thus, where there is a relative oscillation within predetermined limits the stranded body will yield sufficiently to permit such relative movement. On the other hand, the fact that the resilient body is under initial tension, places it in better condition for the transmission of other stresses incident to the use of the joint in mechanical structures.

What I claim as my invention is:

1. An oscillation joint comprising a substantially rigid inner member and a surrounding body including resilient disks at opposite ends of said member, and intermediate circumferentially wound strands of resilient material stretched longitudinally to be under a predetermined initial tension and completely filling the space between said disks.

2. An oscillation joint comprising a substantially rigid inner member and a surrounding body including resilient disks at opposite ends of said member, intermediate circumferentially wound strands of resilient material stretched longitudinally to be under a predetermined initial tension and completely filling the space between said disks, and a substantially rigid tubular casing surrounding said body.

3. An oscillation joint comprising a substantially rigid inner member and a surrounding body including resilient disks at opposite ends of said member, intermediate circumferentially wound strands of resilient material stretched to be under a predetermined initial tension and completely filling the space between said disks, and a substantially rigid tubular casing surrounding said wound body and disks and having its opposite ends turned inward into shouldered engagement with said disks.

4. An oscillation joint comprising a substantially rigid inner member having outwardly extending shoulders adjacent the opposite ends thereof and a surrounding body including a plurality of resilient disks arranged adjacent to each shoulder and intermediate filling formed of wound strands of resilient material stretched to be under a predetermined initial tension completely filling the space between the inner disks, and a substantially rigid tubular casing surrounding said wound body and inner disks with its opposite ends turned inward into shouldered engagement with said disks, the outer disks being arranged between said shoulders and the shoulders on said inner member.

DELL A. MEAD.